(12) United States Patent
Dömkes et al.

(10) Patent No.: US 11,548,087 B2
(45) Date of Patent: Jan. 10, 2023

(54) RESISTANCE WELDING OF UNWELDABLE METALS WITH THERMAL SPRAYED INTERLAYERS

(71) Applicant: OUTOKUMPU OYJ, Helsinki (FI)

(72) Inventors: Christian Dömkes, Krefeld (DE); Thomas Hündgen, Juechen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 678 days.

(21) Appl. No.: 16/487,930

(22) PCT Filed: Feb. 16, 2018

(86) PCT No.: PCT/EP2018/053892
§ 371 (c)(1),
(2) Date: Aug. 22, 2019

(87) PCT Pub. No.: WO2018/153785
PCT Pub. Date: Aug. 30, 2018

(65) Prior Publication Data
US 2019/0381592 A1    Dec. 19, 2019

(30) Foreign Application Priority Data

Feb. 24, 2017 (EP) .................................. 17157773

(51) Int. Cl.
*B23K 3/047* (2006.01)
*B23K 26/323* (2014.01)
(Continued)

(52) U.S. Cl.
CPC ............ *B23K 3/0478* (2013.01); *B23K 11/06* (2013.01); *B23K 11/10* (2013.01); *B23K 11/11* (2013.01); *B23K 11/14* (2013.01); *B23K 11/163* (2013.01); *B23K 11/20* (2013.01);
*B23K 26/323* (2015.10); *B32B 15/012* (2013.01); *C23C 4/02* (2013.01); *C23C 4/06* (2013.01); *C23C 4/08* (2013.01);
(Continued)

(58) Field of Classification Search
None
See application file for complete search history.

(56) References Cited

FOREIGN PATENT DOCUMENTS

| JP | H04251676 A | 9/1992 |
|---|---|---|
| WO | 0038854 A1 | 7/2000 |
| WO | WO0038854 * | 7/2000 |

OTHER PUBLICATIONS

Oikawa H et al, "New Resistance Welding Techniques for Steel and Aluminium", Welding International, Taylor & Francis, Abingdon, GB, vol. 7, No. 10, 1 Jan. 7, 1993 (Jan. 1, 1993), pp. 820-827, XP000397738, ISSN: 0950-7116.

(Continued)

*Primary Examiner* — Daniel J. Schleis
(74) *Attorney, Agent, or Firm* — Quinn IP Law

(57) ABSTRACT

A method for joining of at least two materials, non-weldable directly to each other with thermal joining processes in a lap joint configuration includes a two step sequence including a first step to apply a thermomechanical or mechanical surface protection layer on the surface of a (stainless) steel substrate and a second step where, a thermal joining process is used to weld the sprayed layer with an applied aluminum sheet without having brittle intermetallic phases in the whole material configuration.

17 Claims, 2 Drawing Sheets

Figure 1:
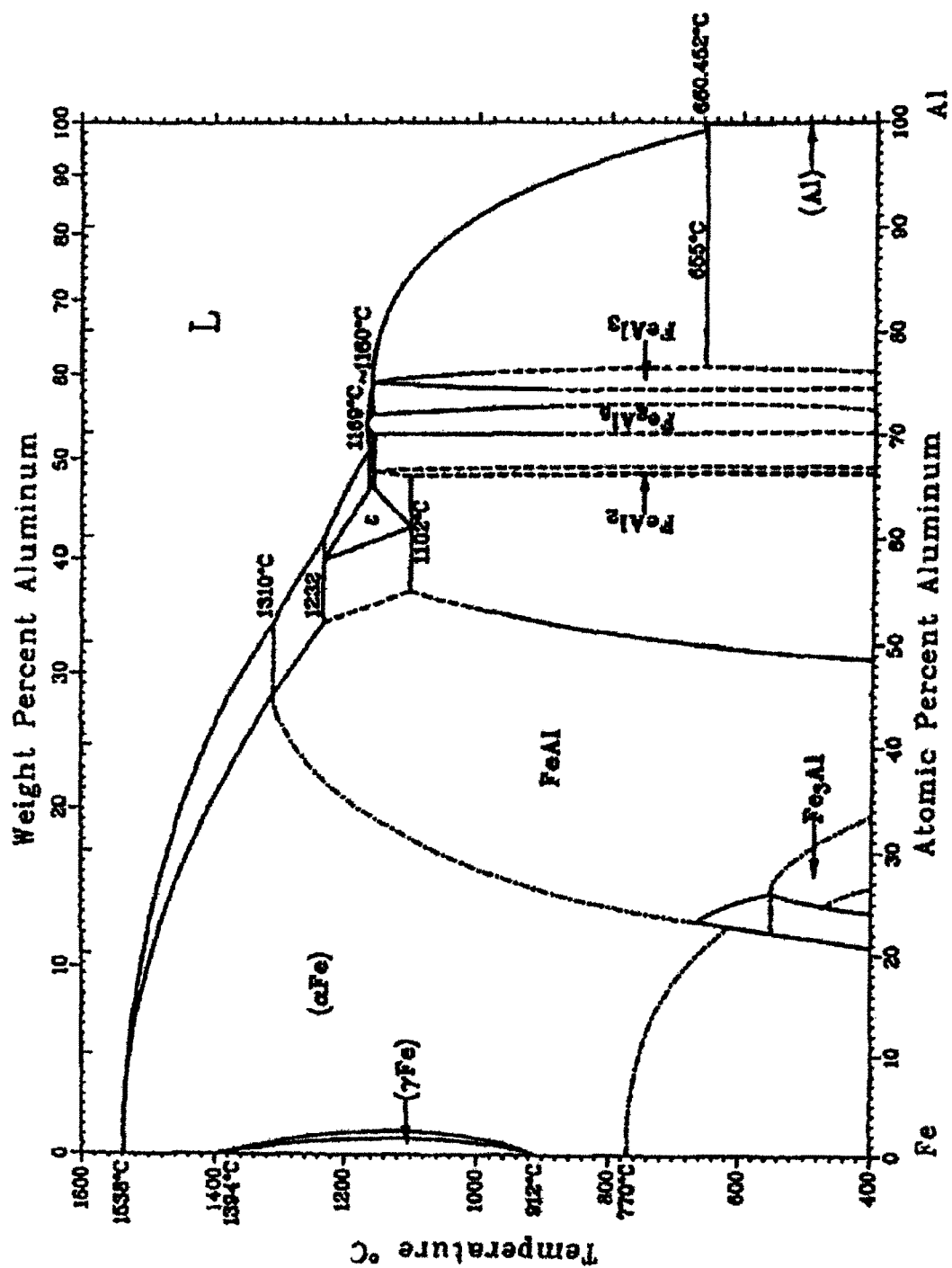

(51) Int. Cl.
    *B23K 11/06*    (2006.01)
    *B23K 11/16*    (2006.01)
    *B32B 15/01*    (2006.01)
    *C23C 4/02*     (2006.01)
    *C23C 4/08*     (2016.01)
    *C23C 4/10*     (2016.01)
    *B23K 11/11*    (2006.01)
    *B23K 11/20*    (2006.01)
    *C23C 4/06*     (2016.01)
    *C23C 4/18*     (2006.01)
    *B23K 11/10*    (2006.01)
    *B23K 11/14*    (2006.01)
    *B23K 103/20*   (2006.01)
    *B23K 103/04*   (2006.01)

(52) U.S. Cl.
    CPC .................. *C23C 4/10* (2013.01); *C23C 4/18* (2013.01); *B23K 2103/04* (2018.08); *B23K 2103/20* (2018.08)

(56) References Cited

OTHER PUBLICATIONS

Sun X et al: Resistance Spot Welding of Aluminum Alloy to Steel With Transition Material-From Process to Performance—Part I: Experimental Stud, Welding Jour, American Welding Society, Miami, FL , US, vol. 83, No. 6, Jun. 1, 2004 (Jun. 1, 2004), pp. 188-S, XP008085610, ISSN: 0043-2296.

Written Opinion of the International Searching Authority issued by the European Patent Office in relation to International Application No. PCT/EP2018/053892 dated Apr. 24, 2018 (6 pages).

International Search Report issued by the European Patent Office acting as the International Searching Authority in relation to International Application No. PCT/EP2018/053892 dated Apr. 24, 2018 (4 pages).

* cited by examiner

RESISTANCE WELDING OF UNWELDABLE METALS WITH THERMAL SPRAYED INTERLAYERS

CROSS-REFERENCE TO RELATED APPLICATIONS

This application is a national phase entry under 35 U.S.C. 371 of PCT International Application No. PCT/EP2018/053892 filed Feb. 16, 2018, which claims priority to European Patent Application No. 17157773.7, filed Feb. 24, 2017, the disclosure of each of these applications is expressly incorporated herein by reference in their entirety.

The present invention relates to make unweldable metal combinations like aluminium to (stainless) steel resistance weldable by applying an aluminum thermal-sprayed layer on the surface of the (stainless) steel with a well-defined thickness, surface roughness and transition resistance. Then in a second step the resistance (spot) welding process follows. The used welding parameters must be selected in a way that only the aluminium to aluminium contact area melts without having brittle intermetallic phases between the aluminium layer and the (stainless) steel.

The resistance welding is one of the most used welding procedures in metal manufacturing industries. The resistance welding can be carried out for instance by spot welding, roller seam welding, Projection welding or weldbonding in order to have welded white goods, fuel tanks, body construction of cars, railways or trucks. But there are a lot of materials, such as hot formed martensitic stainless steels or two and three joint material combinations which do not have weldability for a resistance welding process. For those materials there are several ideas to create mechanical solder or brazing depots on the material. However, those mechanical solder or brazing depots require deformation and/or cutting of the material in order to have good bond or form closure between the material and the mechanical solder or brazing depots. When the materials are further treated by the traditional resistance welding processes, the weld spot has typically as results cold cracks brittle fracture behavior and therefore low strength level as well as a low transmission of power.

The whole automotive car body engineering industry wants to use different metals like (stainless) steels and aluminium in multi-material design with dissimilar joints. State of the art there is no thermal welding method available, only bonding and mechanical joining can be used. With conventional welding methods, brittle intermetallic phases results between aluminum and (stainless) steel. With the invention the cheap and fast-cycle-time resistance spot welding can be used. Further the (contact) corrosion resistance can be increased. With the invention joining forces like similar aluminum joints can be reached for dissimilar combinations.

The EP patent application 2679328 A1 relates to a method for joining a first joining partner with a second joining partner by means of an electrical resistance welding and a procedural modern permanent connection between the two joining partners. Object is to provide an alternate way for joining a first joining partner with a second joining partner using a joining auxiliary and a welding process, in particular to provide a way to add different parts to be joined, in particular, different joining partners, in which at least one comprises an oxide layer.

The DE patent application 102016106756 relates to a thermal spray for corrosion protection, for example, an aluminum thermal spray. In one embodiment, a corrosion resistant assembly is provided, comprising: a first metal part which is assembled with a second metal component, a joint between the first and the second component, and a corrosion protection layer, at least a portion of the joint covers, wherein the corrosion protective layer of aluminum or zinc.

The DE patent application 102014011599 relates a method for joining at least two components, wherein in process and production technical simple manner a reliable connection of the two components is possible. The weld nugget forms centrally from between the joining auxiliary member and the inside of the second component (steel). This allows the disadvantages of the eccentric material-locking connection, as well as a bad lens formation, inclination of the joining auxiliary element, pore and void formation and isotopically strength properties are reduced. The diameter of the dome above material thickening may be smaller than the element head diameter and be dimensioned only so high that a still permissible gap between the two components is obtained.

The EP patent application 1582283 relates to a process for spot welding two rigid steel sheet parts that are finally primed or painted in an electrophoretic bath comprises arranging small platelets, preferably of easily welded metal such as low-carbon iron, between the sheets at the welding points. The method for spot welding of two sheet metal parts made of high strength steel, which is then painted by means of an electrophoresis bath or be painted.

The DE patent application 10251414 relates to a method for spot welding or soldering by means of resistance or inductive heating of components, in particular sheet metal parts made of metallic materials, as well as a specific method for carrying out the joining auxiliary member. A process for spot welding or soldering using resistance or inductive heating comprises determining the heat introduction by a controlled change of the current strength and the joining force depending on a selected cross-sectional contour of a joint auxiliary element inserted between components to be welded or soldered.

The DE patent applications 102004025493 and 102004025492 relates to a method for joining components, a joining element and a component for joining components. Two or more joining parts, particularly metal sheets and/or sheets of plastic by means of joining elements are joined together. When joining the elements it can serve rivets or bolts. The components to be joined are provided with openings, in particular provided bores into which the joining elements can be inserted. The parts to be positioned to each other and then joined by soldering of the joining elements. Advantageously can be used as a conventional welding a conventional welding gun, but where is the required heat input due to the soldering significantly lower compared to welding.

The DE patent application 102012013325 relates to a composite of three or more components easier to manufacture, in particular through a simplified pre-fixing of two or more components to a partial composite prior to final manufacturing of the entire composite component. A method for assembling components of different materials. An improved composite component of a first component, carried out to enable a second component and a third component, a provision of an auxiliary bonding means, a manufacturing a part composite of one of the two components by means of the joining auxiliary, with: penetration of two of the components by means of the joining aid and producing a positive and/or non-positive connection between the two of the components and the joining tool and a joining of the partial composite penetrating joining auxiliary to a remaining one of the components by a pressure welding.

The DE patent application 102012013589 relates to a self-punching fastening element for the resistor element welding for joining more than two formed from flat material components. A self-piercing fastening element of the type mentioned which is suitable for the joining of more than two components, wherein at least one of these components may also be formed from a non-plastic deformable material.

The WO patent application 2010022709 relates to a method of producing a joint connection is thus provided at least between a sheet metal part made of steel, in particular a hot-shaped high-strength steel, and at least one sheet metal component from an aluminum material, in which first a solder deposit by an arc or laser process to ensure safe transportation to one of the metal components is fixed and then disposed between the sheet metal parts on arranged solder deposit and the metal components by applying an electric current and applying the metal components compressive pressure force or be heated by induction heating in the region of a joint such that between the sheet metal part made of steel and the solder deposit a solder and formed between the sheet metal component from aluminum material and the solder deposit a welding or soldering.

The U.S. patent application U.S. Pat. No. 5,273,204 relates to a method where a butt joint configuration is used to thermal-spray a weld seam into the v-shaped butt joint. The thermal sprayed material is at the same time on the weld seam.

The U.S. patent application 20100089977A1 describes a friction stir welding process, where a powder is loosely applied between the two metals to create a special metallurgy and to harden for example an aluminium alloy.

State of the art there is that it doesn't exists any welding method to join dissimilar metal combinations like aluminium to (stainless) steel, only bonding or mechanical joining (both with lower power transmission) works. During conventional (resistance) welding, the welding contact area melts creating brittle intermetallic phases of $FeAl_3$ and $Fe_2Al_5$ in temperature areas above 350° C.

In the course of increasing multi-material design for car body engineering, the manufacturing industry uses aluminium and (stainless) steels concurrent. Resistance spot welding is the main used joining method in car body engineering.

The idea of the present invention is to make unweldable metal combinations like aluminium to (stainless) steel or general unweldable materials like hot formed martensitic stainless steels resistance weldable by applying an alumimum thermal-sprayed layer on the surface of the (stainless) steel with a well-defined thickness, surface roughness and transition resistance. Then in a second step the resistance (spot) welding process follows. The used welding parameters must be selected in a way that only the aluminium to aluminium contact area melts without having brittle intermetallic phases between the aluminium layer and the (stainless) steel.

The formula for the phase growth can be formulated with parabolic growth curve: $X_m^2 = k \cdot t$, where $x_m$ = average penetration depth = intermetallic phase thickness, k = growth coefficient, literature value: $8.46 \cdot 10^{-15}$ $m^2/s$ at 873K t = welding time.

The parabolic growth curve formula provides information on the layer thickness for typical spot welds, which means a strength decrease of more than 50% in comparison to the aluminum base material.

Layer thickness typical for spot welds is greater than or equal to 15 µm. That means a strength decrease of more than 50% in comparison to aluminium base material (280 $N/mm^2$). As a result of this the invention must avoid any growth of an intermetallic phase during welding.

The thermomechanical coating method regarding to this invention can consist of flame spaying, arc spraying, plasma spraying, laser spraying, cold gas spraying, detonation spraying, high velocity oxygen fuel spraying or molten pool spraying.

In the process of the spray material or spraying consumable is supplied as a wire, rod, bar, cord, powder or as a molten pool.

The materials, non-weldable directly together without the thermal sprayed layer to be used by the method of the present invention can be for instance steels like unalloyed, low-alloyed or stainless steels, aluminium, an aluminum based alloy, magnesium or a magnesium based alloy.

The thermal sprayed layer is welded according to this invention with the applied sheet by arc, laser beam, electron beam, stud or plasma welding, preferably with a resistance welding process like resistance spot welding, weldbonding, resistance roller seam welding or projection welding. Naturally, other welding methods can be used in the welding process according to the present invention.

The ratio of the thermal sprayed layer thickness to the reached by spot weld diameter is under/lower or equal to 0.25 mm.

The total sheet thickness including substrate, thermal sprayed layer, applied sheet, is between 1.5 mm up to 6.0 mm, while the transition zone between thermal sprayed layer and the base material is under 350° C. One typical thickness combination for thin seat structure parts in transportation applications can be:

$$T[mm] = t_{base} + t_{sprayed\ layer} + t_{applied\ sheet} = 0.5\ mm + 0.25\ mm + 0.75\ mm = 1.5\ mm$$

Another example of a thickness design can be created for crash-relevant structural parts of passenger cars like a b-pillar or a connectivity of a battery housing for an electric vehicle:

$$T[mm] = t_{base} + t_{sprayed\ layer} + t_{applied\ sheet} = 1.7\ mm + 1.5\ mm + 2.8\ mm = 6.0\ mm$$

Whereby T is the total sheet thickness [mm] summing up of $t_{base} + t_{sprayed\ layer} + t_{applied\ sheet}$ $t_{base}$ is the sheet thickness [mm] of the base material, in the upper example of (stainless) steel. $t_{sprayed\ layer}$ is the thickness [mm] of the thermal sprayed layer, in the upper examples manufactured with an arc spraying process where a wire of $AlMg_3$ was used. At least $t_{applied\ sheet}$ is the thickness [mm] of the sheet, which is applied onto the thermomechanical coated layer, which was in the upper examples of an aluminum sheet of an EN AW-6081 alloy.

The substrate to be thermal sprayed can consists of a steel material, preferably unalloyed or low-alloyed steel with a hot-dip and electrolytically galvanized surface coating. More preferably it is a stainless steel with a chromium-oxid passivation layer. Additionally the materials to be used suitable in the method of the present invention can be also hot-formed or press-hardened steels with a scaled surface or a surface protection layer with aluminum-silicon or zinc layer coating.

The method works especially for brittle materials like high-strength steels with a tensile strength over 800 MPa. Also the substrate to be thermal sprayed can be an unalloyed or low-alloyed steel having the carbon equivalent (CEV) more than 0.65%, where CEV is calculated using a formula (element contents by weight %) CEV=C+Mn/6+(Cu+Ni)/15+(Cr+Mo+V)/5.

Also the substrate surface can be treated in accordance with the present invention pretreated by cleaning or degreasing, and blasting or peening. In that case the blasting abrasive for blasting or peening can consists also of corundum, steel wire, silicium carbide, and hard cast gravel or glass bead.

The present invention shows a high power transmission of those dissimilar welds. The fracture behavior can be concentrated into the applied sheet area. Therefore it is possible with the invention to reach a higher or equal power transmission in relation to a similar weld of one of the materials in state of the art, compared to the same thickness combination.

The preferably resistance welding process step to be used in the method of the present invention can be carried out by different kinds of the resistance welding, such as spot welding, roller seam welding, projection welding or weld-bonding.

Figure 2:
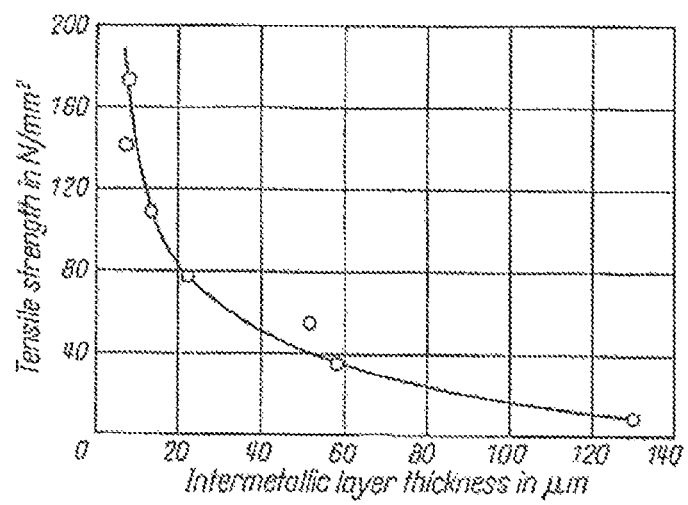
Figure 3:
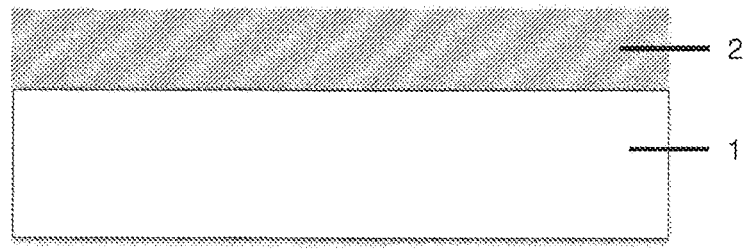
Figure 4:
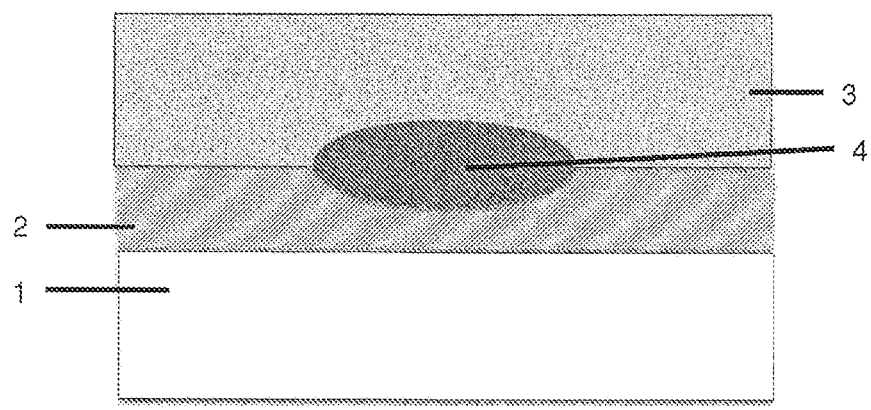

The invention is described in more details in the following referring to the drawings, wherein FIG. 1 illustrates as described in the prior art of the invention binary system Fe/Al intermetallic growth of phases between aluminium and steel, FIG. 2 illustrates as described in the prior art of the invention a relation of intermetallic layer thickness and resulting strength level, FIG. 3 illustrates one preferred embodiment of the thermal sprayed layer with the (stainless) steel substrate of the invention schematically from the side view and it shows the first step of sprayed aluminum layer to the base material/substrate, FIG. 4 illustrates another preferred embodiment of the resistance spot welded thermal sprayed aluminum layer with an aluminum flat sheet of the invention schematically from the side view, where the welded thermal sprayed layer/stainless steel with another aluminum flat sheet is shown.

One kind of example is to create an aluminium thermal sprayed layer on to the top of stainless steel surface, which uses the effect of diffusion, adhesion, mechanical interlocking of the layer, chemical binding and where the layer on stainless steel is consisting of an aluminium-based alloy and which combination is welded by a resistance welding with an applied aluminum sheet to avoid intermetallic brittle phases.

In FIG. 1 illustrates a theoretical background for a binary system, which only works for infinitely long cooling rates and as a result of that the resistance spot welding has≈1,500 K/s cooling rate with brittle intermetallic phases: $FeAl_3$ and $Fe_2Al_5$. A binary system* of Fe/Al is represented with a temperature range.

*The source is from Guimaraens, E., university of Bayreuth, 2005.

In FIG. 2 illustrates a theoretical background for a phase growth, which is formulated with parabolic growth curve. The relation of intermetallic layer thickness and tensile strength is presented. As a result a layer thickness for typical spot welds is more than or equal to 15 μm. The curve shows a strength decrease of more than 50% in comparison to aluminium base material (280 N/mm²). Because of that phenomenon in the present invention a method regarding to this any growth of an intermetallic phase during welding must avoid.

In FIG. 3 illustrates a schematic view of the preferred embodiment of the invention from the side view. The thermomechanical or mechanical Al-alloyed surface coating manufactured with a thermal sprayed interlayer (2) is on the top of substrate material (1) like stainless steel, which is non-weldable directly to each other.

In FIG. 4 illustrates a schematic view of the preferred embodiment of the invention from the side view, where conventional resistance welding process between thermal sprayed coating layer (2) on substrate (1) and an applied aluminium (3) sheet is used to join the material combination. There exist between the substrate (1), thermal sprayed interlayer (2) and aluminium sheet (3) a spot weld area (4). The temperature in the contact area between the substrate (1) and the thermal sprayed coating layer is under 350 Celsius degree.

The invention claimed is:

1. A method for joining at least two materials, non-weldable directly to each other with a thermal joining processes in a lap joint configuration, comprising a first step of applying a surface protection layer on a surface of a steel substrate and a second step of welding, via a thermal joining process, the surface protection layer with an applied aluminium sheet without having brittle intermetallic phases in the whole material configuration;
   wherein the surface protection layer is an aluminium sprayed layer; and
   wherein the welding of the whole material configuration is set-up as a lap joint.

2. The method according to the claim 1, wherein only the aluminium sprayed layer to aluminium sheet contact area melts without having brittle intermetallic phases in a contact zone between the aluminium sprayed layer and the steel substrate.

3. The method according to the claim 1, wherein the surface protection layer is applied by a thermomechanical coating method.

4. The method according to the claim 1, wherein the surface protection layer is applied by a thermal spraying method.

5. The method according to claim 1, wherein the sprayed aluminium layer is at least one of aluminium, an aluminium based alloy or a combination of aluminium with carbides.

6. The method according to claim 1, wherein the aluminium sprayed layer is welded with the applied sheet by a resistance welding method.

7. The method according to claim 1, wherein a ratio of the aluminium sprayed layer thickness to a reached spot weld diameter is at most equal to 0.25.

8. The method according to claim 1, wherein a total sheet thickness comprising steel substrate, aluminium sprayed layer and applied aluminium sheet, is at least 1.5 mm and at most 6.0 mm.

9. The method according to claim 1, wherein a thickness of the aluminium sprayed layer is at least 0.25 and at most 1.5 mm.

10. The method according to claim 1, wherein the steel substrate comprises carbon steel having a carbon equivalent (CEV) of at least 0.65%, where CEV is calculated using a formula, element contents by weight percentage, of CEV=C+Mn/6+(Cu+Ni)/15+(Cr+Mo+V)/5.

11. The method according to claim 1, wherein the steel substrate comprises a carbon steel material.

12. The method according to claim 1, wherein the steel substrate comprises stainless steel.

13. The method according to claim 1, further comprising the step of pretreating the substrate surface by cleaning and blasting.

14. The method according to claim 11, wherein the carbon steel material comprises carbon steel with a galvanized surface coating.

15. The method according to claim 6, wherein the resistance welding method comprises at least one of weld bonding, spot welding, projection welding or roller steam welding.

16. A method for joining at least two materials, non-weldable directly to each other with a thermal joining processes in a lap joint configuration, comprising a first step of applying a surface protection layer on a surface of a steel substrate and a second step of welding, via a thermal joining process, the surface protection layer with an applied aluminium sheet without having brittle intermetallic phases in the whole material configuration;

wherein the surface protection layer is an aluminium sprayed layer; and wherein the sprayed layer is welded with the applied sheet by a resistance welding method.

17. A method for joining at least two materials, non-weldable directly to each other with a thermal joining processes in a lap joint configuration, comprising a first step of applying a surface protection layer on a surface of a steel substrate and a second step of welding, via a thermal joining process, the surface protection layer with an applied aluminium sheet without having brittle intermetallic phases in the whole material configuration;

wherein the surface protection layer is an aluminium sprayed layer; and wherein the sprayed layer is applied by a thermomechanical coating method or a thermal spraying method.

* * * * *